UNITED STATES PATENT OFFICE.

ALBERT LÉON ARNAUD AND SWIGEL POSTERNAK, OF PARIS, FRANCE, ASSIGNORS TO THE FIRM OF F. HOFFMAN-LA ROCHE AND COMPANY, OF GRENZNACH, GERMANY.

TARIRIC ACID DI-IODID.

982,656.  Specification of Letters Patent.  Patented Jan. 24, 1911.

No Drawing.  Application filed October 18, 1909.  Serial No. 523,347.

*To all whom it may concern:*

Be it known that we, ALBERT LÉON ARNAUD, a citizen of the French Republic, and SWIGEL POSTERNAK, a subject of the Emperor of Russia, residing at Paris, France, have invented certain new and useful Improvements Relating to Compounds of Tariric Acid, of which the following is a specification.

The tariric acid combined with glycerin in the fruits of various kinds of picramnia was discovered quite a long time ago by one of us as the first naturally occurring fatty acid with a triple carbon bond. As such it is able to add on one or two molecules of a halogen. Hitherto the addition of iodin to unsaturated fatty acids has, however, been a difficult task. Liebermann and Sachse (*Berichte der Deut. Chem. Gesellschaft*, 24, p. 4116) only succeeded in doing so in a troublesome manner, *e. g.* in the case of stearolic and behenolic acids, when they subjected carbon disulfid solutions of these acids to light for several days in the presence of molecular quantities of iodin and some ferrous iodid, without thereby obtaining good yields. We have therefore gone to work in a different way, to obtain from tariric acid the as yet entirely unknown di-iodo derivative, and we have found that the addition of a molecule of iodin to this acid takes place rapidly and almost quantitatively, if the reaction be conducted in a solution of glacial acetic acid at temperatures between 50 and 60 degrees centigrade. We have also found that the introduction of two atoms of iodin into tariric acid can also be effected in aqueous solution in an easy manner and not quite so well in chloroform, benzene and similar solvents of fatty acids.

The details of procedure will be explained below by the aid of two examples.

Example I: One part of weight of tariric acid $C_{18}H_{32}O_2$ (*Comptes Rendus de l'Academie des Sciences* CXXII, 1000) is dissolved in 3 parts by weight of warm glacial acetic acid; to this solution are added slowly and with stirring 0.91 parts by weight of solid iodin. The whole is allowed to stand for an hour and the mixture, after having been decolorized with sulfurous acid by conducting the latter in gaseous shape into the solution of glacial acid until the desired effect is obtained, is poured into about 20 parts of warm water. The oily deposit which forms when this is done, is separated from the aqueous liquid after it has solidified and crystallized from alcohol. If the raw material is not perfectly pure, a quantity of caustic potash, caustic soda or more conveniently ammonia, sufficient to neutralize the acid is added to the warm alcoholic solution of the iodin product, and the alkali salt allowed to crystallize out. The salt, after being separated from the mother liquor, is dissolved in warm alcohol and decomposed by a dilute mineral acid, such for example as sulfuric acid. The free di-iodo-acid then crystallizes out in a chemically pure form. The tariric acid di-iodid $C_{18}H_{32}O_2I_2$ crystallizes in the shape of fine white needles which melt at 48.5° C. and contain 47.56% of iodin. The di-iodid is insoluble in water, easily soluble in alcohol when heated, insoluble in cold glycerin, but slightly soluble when heated. The chemical constitution of the compound may be indicated by the formula:

$$CH_3(CH_2)_{10}-CI=CI-(CH_2)_4-COOH.$$

Example II: One part by weight of tariric acid is dissolved in 10 parts by weight of boiling water, to which has been added caustic soda equal to 1/7 of the weight of the acid. After cooling down, 9 parts by weight of a mixture of 100 grams of iodin, 160 grams of potassium iodid and 740 grams of water are slowly poured into the solution. From the red solution obtained the iodo fatty acid is precipitated with dilute sulfuric acid, filtered and washed with water, after which it is finally further purified and crystallized as described in Example I. It is obvious that the caustic soda can be replaced by the equivalent quantities of caustic potash, sodium carbonate, etc., and the sulfuric acid by another mineral acid. If caustic potash is used 0.20 parts of the same, and if sodium carbonate is used 0.189 parts of the same are dissolved in 10 parts of water.

The di-iodid of tariric acid provides an extraordinarily manageable and, owing to its very intense action, valuable body for iodin therapeutics.

What we claim is:—

1. The process for the manufacture of tariric acid di-iodid, which consists in dissolving tariric acid in a solvent and reacting upon the solution with iodin, substantially as described.

2. The process for the manufacture of tariric acid di-iodid, which consists in dissolving tariric acid in glacial acetic acid, treating the solution with iodin, decolorizing with sulfurous acid the mixture thus obtained, forming a precipitate by mixing with water and crystallizing the precipitate, after congealing, by means of alcohol, substantially as described.

3. As a new product, tariric acid di-iodid $C_{18}H_{32}O_2I_2$, crystallizing as white needles, melting at 48.5° C. and containing 47.56 per cent. of iodin, substantially as described.

In testimony whereof we have hereunto set our hands in presence of two subscribing witnesses.

ALBERT LÉON ARNAUD.
SWIGEL POSTERNAK.

Witnesses:
GEORGE E. LIGHT,
H. C. COXE.